2,816,357

METHOD OF SOLDERING WITH A POLYESTER FLUX

James E. Henning, Madison, Wis., assignor to Bjorksten Research Laboratories, Inc., Madison, Wis., a corporation of Illinois No Drawing. Application August 27, 1953, Serial No. 376,980

4 Claims. (Cl. 29—495)

This invention relates to soldering fluxes, and more specifically to non-corrosive soldering fluxes.

Heretofore polyamine-type materials, and also rosin acids have been used as non-corrosive soldering fluxes. However, these have the disadvantages of either giving a particularly unpleasant odor when used, or, in the case of rosin, of forming a brittle and imperfect protection, as well as being limited in their efficiency as fluxes.

The present invention has for its object a non-corrosive flux, which gives exceptional protection to the parts soldered, is convenient to handle, and does not give off any excessive odors in use.

Another object of this invention is to permit the application of the flux to the metal to be soldered, in the form of a coating, at any time prior to the soldering operation. This is a major convenience, for example, in the manufacture of articles such as heat exchangers, where metal sheet is to be soldered over large areas in irregular patterns.

Further objects will become apparent as the following detailed description proceeds.

In accordance with my invention, I use as a soldering flux a linear polyester product, having an acid number higher than 35.

The invention is further illustrated by the following specific example:

Example 1

Two moles of fumaric acid, 1 mole of hexachloro endomethylene tetrahydro phthalic acid, 0.75 mole of propylene glycol, and 0.75 of ethylene glycol were heated together, until an acid number of 50 to 65 had been reached. The resin having an acid number of 50 was solid up to 90° C., the resin having an acid number of 65 was solid up to 80° C. These resins thus can be used very conveniently in the form of sticks, and provide an excellent protection of the solder joint as well as good fluxing action.

I may use hexachloro endomethylene tetrahydrophthalic anhydride, tetrachlorophthalic anhydride, succinic acid, adipic acid, and the like. For the purpose of this description acid anhydrides are equivalent to acids, as the acids are formed from the anhydrides by the addition of water of condensation.

Instead of propylene glycol I may use other glycols, such as for example ethylene glycol, diethylene glycol, dipropylene glycol and the like.

While the preferred acid number is in the order of 65, I have obtained suitable compositions with acid numbers as low as 35 and as high as 100. The preferred range of acid number is between 50 and 75.

While the proportions of these ingredients are not very critical, it is preferable that the acid components and the alcohol components be in stoichiometrical balance, within about ±15%.

It is preferred to use linear polymers, which melt at a temperature somewhat above room temperature, but can be handled in the form of sticks or rods at room temperature. Such products are obtainable by the use of halogenated di-valent acids in preparing the resin. The acids thus employed must contain at least one halogen atom per molecule of one major constituent. To counteract the corrosive action on copper of any trace halogen acid that may be split off, I prefer to include in the composition a sulfobenzothiazole, for example mercaptobenzothiazole in amount preferably of .05% to 1%. Even when halogen free acids are used in preparing the polymers, the inclusion of mercaptobenzothiazole may be desirable.

As such a halogenated acid I may use for example, hexachloroadipic acid, hexabromoendomethylene tetrahydrophthalic anhydride, dibromo, iodo, trichloroendomethylene tetrahydrophthalic anhydride, tetrachloro fumaric acid, dibromo diiodo sorbic acids, and the like. Regardless of the steric position, the substitution of halogen for hydrogen in the acid component tends to increase the melting point of the resultant resin to a possibly desired range of about 70–150° C.

The flux of the invention may be either a paste formed by dissolving the solid polyester in a suitable volatile solvent or a solid. If solid, it may be used as a stick which is rubbed on the surfaces to be joined prior to applying molten solder thereto. It may be utilized to provide either a flux-cored soldering wire or a soldering stick comprising a core of solder metal and a layer of flux therearound.

It is thus seen that the invention is broad in scope and is not to be limited excepting by the claims in which it is my intention to cover all novelty inherent in the invention as broadly as possible in view of prior art.

Having thus disclosed my invention, I claim:

1. The process of soldering, which comprises the steps of applying to two metal surfaces a linear solid highly chlorinated polyester product having an acid number of between 35 and 100, which is the reaction product of a chlorinated polybasic acid and a polyhydric alcohol, and then applying molten soldering metal to a junction of said surfaces, so as to solder them together.

2. The process of soldering, which comprises the steps of applying to a metal surface a coating of a linear solid highly chlorinated polyester material having a melting point in the range of 70 to 150° C. and an acid number of 35 to 100, which is the reaction product of a chlorinated polybasic acid and a polyhydric alcohol, superimposing thereon another metal surface, and applying molten solder to join said surfaces, the said polyester acting as a soldering flux.

3. The process of soldering together two metal surfaces comprising the steps of applying to at least one of the surfaces to be joined a solid polyester product of the reaction between a highly chlorinated polybasic acid and a polyhydric alcohol, said product having a melting point of from 70° to 150° C. and an acid number of between 35 and 100, applying heat to said surfaces until said product is liquid, applying solder to said surfaces, placing said surfaces together, and allowing the resultant assembly to cool until said product solidifies.

4. The process of soldering together two metal surfaces comprising the steps of applying to at least one of the surfaces to be joined a solid polyester product of the reaction between a chlorinated polybasic acid containing from 1 to 10 carbon atoms and at least one halogen atom in its monomeric molecule and a polyhdric alcohol, said product having a melting point of from 70° to 150° C. and an acid number of between 35 and 100, applying heat to said surfaces until said product is liquid, applying solder to said surfaces, placing said surfaces together, and allowing the resultant assembly to cool until said product solidifies.

(References on following page)

References Cited in the file of this patent

UNITED STATES PATENTS

| | | | |
|---|---|---|---|
| 1,726,100 | DaCosta | Aug. 27, | 1929 |
| 2,092,191 | Thomas | Sept. 7, | 1937 |
| 2,443,737 | Kropa | June 22, | 1948 |
| 2,445,431 | Hill | July 20, | 1948 |
| 2,455,873 | Nordlander et al. | Dec. 7, | 1948 |
| 2,585,827 | Padbury et al. | Feb. 12, | 1952 |
| 2,606,206 | Guenthner | Aug. 5, | 1952 |
| 2,616,384 | McBride | Nov. 4, | 1952 |
| 2,621,168 | Ross et al. | Dec. 9, | 1952 |
| 2,673,151 | Gerhart | Mar. 23, | 1954 |
| 2,690,408 | Pessel | Sept. 28, | 1954 |